United States Patent
Ahrens et al.

(10) Patent No.: US 7,603,407 B2
(45) Date of Patent: Oct. 13, 2009

(54) METHOD AND SYSTEM FOR REGISTERING BINARY DATA

(75) Inventors: Kai Ahrens, Padenstedt (DE); Sven Jacobi, Eddelak (DE)

(73) Assignee: Sun Microsystems, Inc., Santa Clara, CA (US)

( * ) Notice: Subject to any disclaimer, the term of this patent is extended or adjusted under 35 U.S.C. 154(b) by 559 days.

(21) Appl. No.: 09/932,229

(22) Filed: Aug. 17, 2001

(65) Prior Publication Data

US 2002/0083209 A1 Jun. 27, 2002

Related U.S. Application Data

(60) Provisional application No. 60/279,570, filed on Mar. 28, 2001.

(51) Int. Cl.
G06F 15/16 (2006.01)
G06F 15/167 (2006.01)
(52) U.S. Cl. .................. 709/203; 709/214; 709/217
(58) Field of Classification Search ......... 709/214–216, 709/230, 223–225, 245, 203, 217–219; 711/147; 719/312
See application file for complete search history.

(56) References Cited

U.S. PATENT DOCUMENTS

| | | | | |
|---|---|---|---|---|
| 5,946,697 | A * | 8/1999 | Shen | 715/513 |
| 6,061,715 | A * | 5/2000 | Hawes | 709/203 |
| 6,119,135 | A * | 9/2000 | Helfman | 715/513 |
| 6,128,623 | A * | 10/2000 | Mattis et al. | 707/103 R |
| 6,507,867 | B1 * | 1/2003 | Holland et al. | 709/219 |
| 6,553,376 | B1 * | 4/2003 | Lewis et al. | 707/10 |
| 6,553,461 | B1 * | 4/2003 | Gupta et al. | 711/137 |
| 6,615,235 | B1 * | 9/2003 | Copeland et al. | 709/203 |
| 6,826,593 | B1 * | 11/2004 | Acharya et al. | 709/203 |
| 7,082,454 | B1 * | 7/2006 | Gheith | 709/203 |
| 7,127,525 | B2 * | 10/2006 | Coleman et al. | 709/247 |

OTHER PUBLICATIONS

Thomas E. Davis, "*Use JNDI to share objects between different virtual machines*", Javaworld, [Online] Jul. 1999, pp. 109, XP002142437 USA, retrieved from Internet: URL: http://www.javaworld.com/javaworld/jw-07-1999/jw-07-cooltools_p.html> [retrieved on Jan. 29, 2001].

Sun Microsystems, Inc., "*Java Naming and Directory Interface Application Programming Internface (JNDI API)*", Jul. 14, 1999, Sun Microsystems, Inc., XP002145962.

* cited by examiner

*Primary Examiner*—Aaron Strange
(74) *Attorney, Agent, or Firm*—Sonnenschein Nath & Rosenthal LLP

(57) ABSTRACT

Systems, methods, and products provided for facilitating the reuse of data blocks. In one implementation, a registration server receives request data objects from programs that request use of a data block. When the data block is not already registered with the registration server, the registration server registers the data block, for example in a list of registration data objects. A registration handle object is returned to the requesting program and provides a reference to the resources for accessing the data block. The present invention facilitates efficient use of resources in connection with multiple requests for a data block because resources needed for handling the binary data block are not duplicated.

3 Claims, 7 Drawing Sheets

METHOD AND SYSTEM FOR REGISTERING BINARY DATA

CROSS-REFERENCE TO RELATED APPLICATIONS

The benefit of the filing date of the following U.S. and foreign patent applications is claimed:

European Patent Application No. 00117723.7, entitled "METHOD AND SYSTEM FOR REGISTERING BINARY DATA", filed on Aug. 17, 2000; and U.S. Provisional Patent Application No. 60/279,570, entitled "METHOD AND SYSTEM FOR REGISTERING BINARY DATA", filed on Mar. 28, 2001.

Both applications are incorporated herein by reference in their entireties.

FIELD OF THE INVENTION

The present invention relates to methods, systems, and products for reducing memory requirements and bandwidth of programs that use data blocks (for example, data blocks representing a graphic image). In particular, the present invention relates to methods, systems, and products for registering data blocks to allow reuse of the data blocks without associated resource duplication.

BACKGROUND OF THE INVENTION

Programs for data processing devices are increasingly used for processing and presenting, as examples, image data files or video data files on a display. Similarly, programs are used for handling audio data files, for example, for recording and playback of voice data files, music data files and the like. Image, video, and audio data files typically comprise binary data blocks. For example, an image file is usually stored as an array of pixels in which each pixel is described by multiple information values (e.g., bytes of color data). Thus, in many instances, image or video files contain large amounts of data to be managed. Audio data files may also grow very large, particularly when voice or music information is sampled at high data rates and each sample is represented by digital information.

When handling binary files or data blocks with data processing devices, a memory area is usually allocated for storing the binary data block representing the image, video, or audio data.

For example, when generating a web-page for display at a browser, memory space will be allocated for images and text elements, as examples. In situations where one graphic element (e.g., an icon indicating a selection of options) is to be displayed multiple times, memory space may be allocated for each representation of the graphic element. When large data blocks underlie the graphic elements, a substantial amount of memory space may be used, resulting in poor performance and lack of available resources for other programs.

In the past, identical graphic elements were represented by a specific handle that allowed sharing internal data structures several times. As a result, a graphic element displayed multiple times occupied one memory space and the program accessed that memory space several times to generate, for example, a bitmap to be output on a display.

The past approach, however, did not perform well in cases where (as one example) graphic elements were inserted by a program sequentially. The poor performance was due in part to the fact that the program did not necessarily know about the existence of a memory area already storing the desired graphic element. This problem was compounded when more than one program accessed the same image, audio, or video data block, because the programs did not know of the internal data structures generated by other programs, particularly in a server-client environment where programs are executed on a server are remotely controlled by a client. For example, numerous clients could access a particular server and independently start a number of programs and instruct these programs to display the same graphic element. The programs would then allocate a memory area for the graphic element for each of the clients communicating with the server, possibly exceeding available memory at the server. Even if it is known that identical descriptors (e.g., URLs) of binary data blocks are in use, a memory area for the data blocks may not be shared.

Furthermore, in scenarios where a client remotely controls a program on a server, and a binary data block (e.g., a graphical element) needs to be transferred to the client multiple times (e.g., for building display content at the client), large bandwidth requirements will arise due to the retransmission of the graphical element multiple times. When the client is connected to a server executing the program on behalf of the client through a low bandwidth communication link, such as a wireless communication link or a telephone line, unacceptably high latency results.

A need has long existed for techniques that address the problems noted above and others previously experienced.

SUMMARY OF THE INVENTION

Systems, apparatus, and products consistent with the present invention facilitate the reuse of a data block (e.g., an image, a sound, or a movie) without duplicative allocation of resources to hold multiple copies of the data block. A registration server maintains a collection of data blocks that have been allocated to a resource (e.g., a memory area). Client programs submit data block requests to the registration server. The registration server determines if the data block that has been requested is already part of the collection of data blocks. If so, the server returns, for example, a registration handle to the program that provides a reference to the resource already allocated for the data block. If not, the server adds the data block to the collection of data blocks in preparation for future requests for the same data block, and returns a registration handle to the program. Thus, one or more programs may reuse the same data block without repetitively allocating resources for each use of the data block. For example, a web browser, word processor, and a spreadsheet may all display the same graphic image while the registration server provides reference to a single memory area allocated once for the graphic image.

Methods, systems, and articles of manufacture consistent with the present invention overcome the shortcomings of the related art by providing a technique for reducing, for example, the memory requirements for client programs that use data blocks. The technique provides an alternative to duplication of resources when a common data block (e.g., a graphical image) is requested multiple times by one or more programs. Thus, for example, a memory area for a data block may be allocated once, while memory areas for duplicate copies of the data block may be released.

As an example, the technique may be implemented across one or more data processing systems that implement a registration server for data blocks. Then, client programs may communicate data block requests to the registration server. In turn, the registration server provides a reference to a resource (e.g., a memory area) allocated for the data block for each request for the data block, thereby eliminating duplicate allocations of resources.

In accordance with methods consistent with the present invention, a method for facilitating reuse of data blocks is provided. The method includes receiving from a client program a data block request identifying a data block, obtaining constituent data that comprises the data block, and deriving a data block identifier from the constituent data. The method includes determining whether the data block is a registered data block in a collection of data blocks using the data block identifier. When the data block is not a registered data block, the data block undergoes registration in the collection of data blocks. In addition, a registration reference is generated for accessing the data block and a registration reference is returned to the client program.

In accordance with methods consistent with the present invention, a method is provided for facilitating reuse of data blocks. The method includes generating at a program a request data object based on a requested data block, communicating the request data object to a determination component, and receiving at the determination component the request data object. The method obtains a request data block identifier derived from constituent data of the requested data block and determines whether the data block is a registered data block in a request data object collection. When the data block is not a registered data block, the method registers the request data object in the collection of data blocks and generates a registration handle object for accessing the data block. The method then returns the registration handle object to the program.

In accordance with articles of manufacture consistent with the present invention, a computer readable medium is provided. The computer readable medium contains instructions that cause a data processing system to perform a method for facilitating reuse of data blocks. The method includes receiving from a client program a data block request identifying a data block, obtaining constituent data that comprises the data block and deriving a data block identifier from the constituent data. The method also includes determining whether the data block is a registered data block in a collection of data blocks, and when the data block is not a registered data block, registering the data block in the collection of data blocks, generating a registration reference for accessing the data block; and returning the registration reference to the requestor.

In accordance with systems consistent with the present invention, a data processing system is provided. The data processing system includes a memory comprising a determination component comprising instructions that ascertain whether a requested data block is represented by existing registration data objects based on a data block identifier derived from constituent data of the requested data block, a filing component comprising instructions that register the requested data block with a new registration data object when the requested data block is not represented by existing registration data objects, and a handle object component comprising instructions that return a registration handle object to a requesting program that specifies a resource associated with the requested data block. In addition, the data processing system includes a processing unit that runs the determination component, filing component, and handle object component.

In accordance with products consistent with the present invention, a computer readable medium is provided that is encoded with a data structure accessed by a registration server program run by a processor in a system. The data structure comprises a linked list of registration data objects. Each registration data object comprises a registration data object pointer for forming a linked list of registration data objects. In addition, each registration data object includes a data block reference to a registered data block and a data block identifier derived from constituent data comprising the registered data block.

Other apparatus, methods, features and advantages of the present invention will be or will become apparent to one with skill in the art upon examination of the following figures and detailed description. It is intended that all such additional systems, methods, features and advantages be included within this description, be within the scope of the present invention, and be protected by the accompanying drawings.

DETAILED DESCRIPTION OF THE INVENTION

Reference will now be made in detail to an implementation in accordance with methods, systems, and products consistent with the present invention as illustrated in the accompanying drawings. Wherever possible, the same reference numbers will be used throughout the drawings and the following description to refer to the same or like parts.

Figure 1:
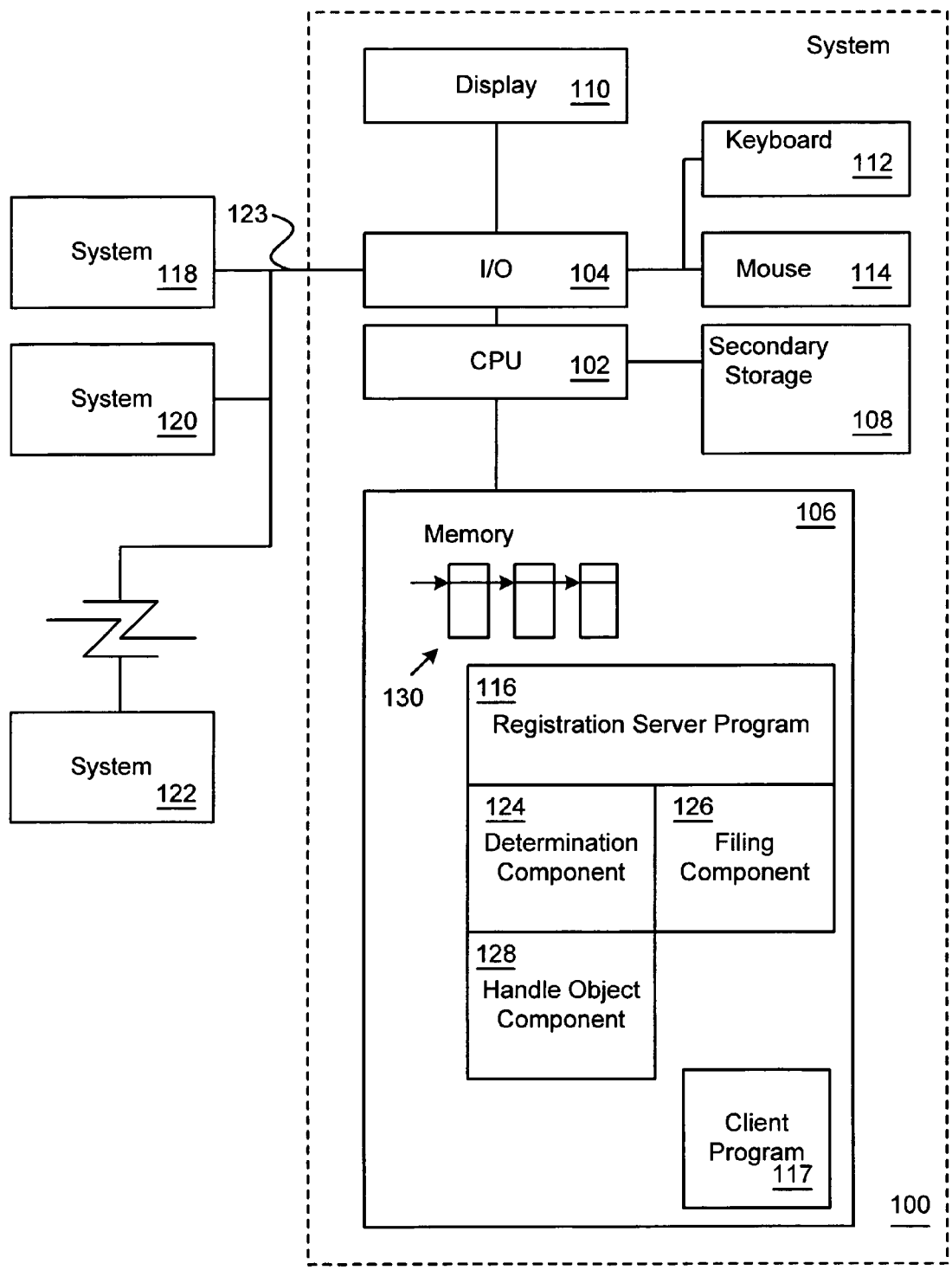
FIG. 1 shows a block diagram illustrating a system for registering data blocks.

FIG. 1 depicts a block diagram of a data processing system 100 suitable for practicing methods and implementing systems consistent with the present invention. The data processing system 100 comprises a central processing unit (CPU) 102, an input output I/O unit 104, a memory 106, a secondary storage device 108, and a video display 110. The data processing system 100 may further comprise standard input devices such as a keyboard 112, a mouse 114 or a speech processing means (not illustrated).

The memory 106 contains a registration server program 116, that includes components described below for receiving requests for data blocks, filing information on the data blocks, generating registration handle objects, and the like. A client program 117 (e.g., a program such as a web-browser, word processor, and the like) issues requests for data blocks to the registration server program 116. Note that the programs may run in the memory 106 on the data processing system 100, or may be distributed between the data processing system 100 and the network data processing systems 118, 120, and 122. Note also that although only one client program 117 is illustrated, there may be many client programs running one or more of the systems 100, 118-122. The network data processing systems 118-122 may include similar components to those in the data processing system 100 and communicate with the data processing system 100 using hardwired or wireless LAN or WAN network links 123, including the Internet.

Although aspects of one implementation are depicted as being stored in memory 106, one skilled in the art will appreciate that all or part of systems and methods consistent with the present invention may be stored on or read from other computer-readable media, such as secondary storage devices, as examples, hard disks, floppy disks, and CD-ROMs; or other forms of ROM or RAM either currently known or later developed. Further, although specific components of data processing system 100 are described, one skilled in the art will appreciate that a data processing system suitable for use with methods, systems, and articles of manufacture consistent with the present invention may contain additional or different components.

With reference again to FIG. 1, the processing system 100 (or any of the network data processing systems 118-122) may operate as a registration server for performing registration operations in connection with binary data blocks. The CPU 102 in the registration server (and, additionally or alternatively, the network data processing systems 118-122) executes program instructions that implement the registration server program 116, typically including a determination component 124 for determining whether a requested data block is already registered, a filing component 126 for filing information related to the data block the memory 106 in case registration information in connection with a requested binary data block is not already registered, and a handle object component 128 for generating a registration handle object based on registration information stored in connection with a binary data block. The registration server program 116 need not be implemented as a single program or as separate programs or processes, however. Rather, the registration programs may be combined into one or more programs or processes, an object oriented class, or divided functionally in other ways.

As will be described in more detail below, the client program 117 generates requests for binary data blocks needed by the client program 117 (e.g., to display an image in a word processing document). The client program 117 and the registration server program 116 communicate bidirectionally locally, or over the network links 123. The system 100 shown in FIG. 1 efficiently handles resources for data blocks, particularly when the client program 117 requests a data block multiple times, for example when a graphic element or an audio element is to be inserted multiple times in a document. The registration program 116 registers each requested data block in the system 100 and therefore repeated requests for a data block may rely on a previously registered version of the data block, rather than independently duplicating or reallocating resources for the that data block. The resource may be, as examples, a memory area allocated for the data block or a process executed in connection with the data block.

As noted above, the registration program 116 includes a determination component 124. The determination component 124 includes program instructions that receive a request data object associated with a binary data block from the client program 117 and that determine whether a registration data object associated with a requested data block (as specified by the request data object) is registered in the memory 106, for example, in a linked list of objects 124.

The determination component 124 may, for example, comprise instructions that compare a data block identifier (typically provided in the request data object or derived from constituent data of the requested data block) with the registration data objects in the memory 106. Generally, a registration data object matching a request data object (and therefore a requested data block) is found when both the registration data object and the request data object refer to the same data block.

When the determination component 124 determines that a registration data object corresponding to the requested data block is not present in the list of registration data objects, then (in most instances) the requested data block is being requested for the first time. Thus, the determination component 124 may then instruct the filing component 126 to file a new registration data object in the list of registration objects in the memory 106 based on the request data object. To that end, the filing component 126 registers a new registration data object, for example, by inserting it into the list of registration data objects 130. The filing component 126 may execute storing operations for saving the registration data object in the memory 30 and updating the list of registration data objects 130. As will be explained in more detail below, the filing component 126 may also add to the registration data object further information on the binary data block, such as identification information (obtained, for example, by the determination component 124), information on the request itself for the binary data block, and the like.

However, when a registration data object corresponding to the requested data block can be identified (i.e., a registration data object exists that is associated with the same data block as the requested data block), then the requested data block was already registered at an earlier point in time. The prior registration typically occurs in response to a previous request data object received from the client program 117. When a corresponding registration data object exists, no further action is required by the determination component 124 or the filing component 126.

As noted above, the registration server includes the handle object component 128 which may comprise instructions for generating a registration handle object based on the registration data object (which, in turn, is associated with a requested data block) and for transmitting the registration handle object to the client program 117. The handle object component 128 is generally responsive to request data objects received by the determination component 124. Thus, when the filing component 126 creates a new registration data object, the handle object component 128 generates and transmits a registration handle object associated with a registration data object to the client program 117 upon completion of the registration operations performed by the determination component 124 and the filing component 126. Furthermore, when the determination component 124 ascertains that a registration data object already exists for the requested data block, the handle object component 128 generates and transmits a registration handle object based on the existing registration data object.

Below, the request data object, the registration data object and the registration handle object are described in detail.

The request data object encapsulates registration request information generated by the client program 117. As explained in more detail below, the registration request information may, for example, include information on the binary data block itself (e.g., image dimension and color depth), information on the requesting entity (e.g., information identifying a particular client program 117), and information on the type of the requested data block (e.g., audio file, image file, or video file), and the like. Furthermore, the request data object may include the binary data of the data block itself or it may include address information indicating already allocated storage for the data block (e.g., a pointer). The request data object may further be associated with processes or operations performed in connection with the requested data block, for example, processes executed at the client program 117.

The registration data object generally includes the same information as the request data object. However, the registration data object and the request data object need not be identical. In particular, as described in more detail below, the registration data object typically includes information identifying the data block. Furthermore, the registration data object includes a registration data object pointer. The pointer is used to form a linked list of registration data objects 130. The registration handle object provides a handle to resources (e.g., a memory area) allocated in connection with a data block. The registration handle object is associated with a new registration data object when the determining program does not find a match between a registration data object and a request data object originally transmitted from the client program 117 in connection with a request for a data block. However, when an existing registration data object corresponding to the requested data block is identified, the registration handle object is associated with an existing registration data object arising from a previous request data object. In other words, the registration handle object is in either case associated with the requested data block. For example, when a client program 117 uses a graphic element represented by a data block several times, the registration server program 116 will generally register the data block in connection with the first request for that data block (i.e., in response to the first request data object). Further requests referring to the same data block may then reuse resources allocated in connection with the first request. Each time the client program 117 need the data block again, they transmit a corresponding request data object to the registration server and a registration handle object is returned to the requesting program. The registration handle object allows the client program 117 to reuse resources allocated in connection with a previous request for the data block.

Thus, the system 100 reduces the amount of resources (e.g., memory storage requirements and/or processing requirements) required to execute the client program 117, since processes and resources executed and allocated in connection with a data block do not have to be duplicated even when the same data block is requested several times by different client programs. For example, a memory storage area for the requested data block may be allocated once and any further storage location allocated for that data block may be released (i.e., one copy of a binary data block is maintained to service multiple requests for the data block).

Figure 2:
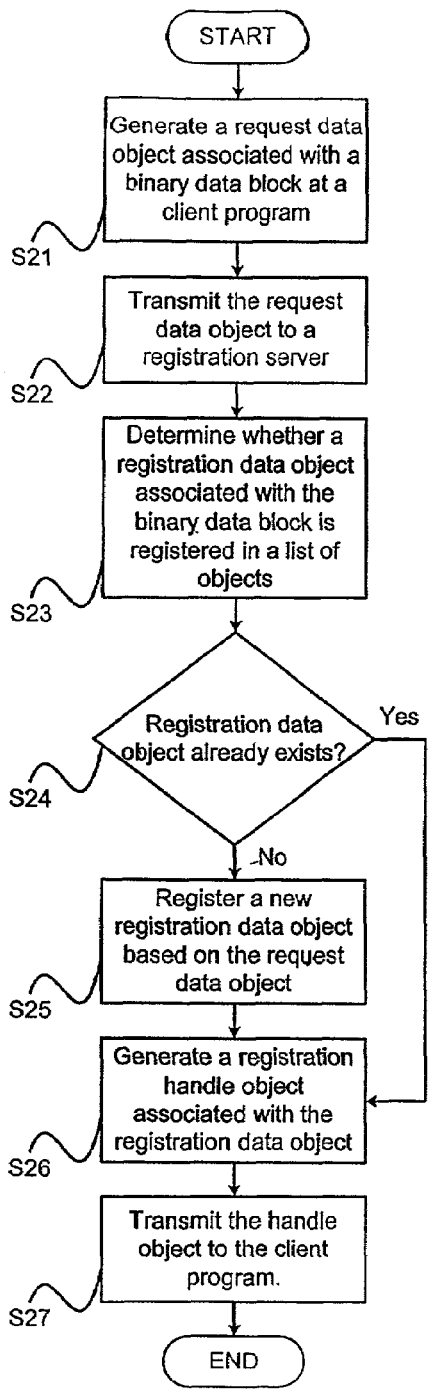
FIG. 2 shows a flow diagram illustrating a flow of processing steps that particularly describe processing steps executed at the registration server.

Turning next to FIG. 2, that figure shows a flow chart of a process for registering data blocks in a manner consistent with the present invention. The processing steps illustrated by FIG. 2 may, for example, be executed by the registration server program 116 using the system 100 or network processing systems 118-122, however, the processing steps are not limited thereto.

At step S21, a client program 117 generates a request data object associated with a requested data block. As noted above, the request data object may include the actual binary data of the requested data block or a reference to a memory area allocated by the client program 117 for holding the requested data block. Further, the request data object may include information on other resources allocated in connection with the binary data block (for example, processes running in the memory 106) in connection with handling the requested data block.

At step S22 a client program 117 transmits the request data object to the registration server. The transmission may be accomplished using interprocess communication techniques, or, when the client program 117 is located on one of the networked processing systems 118-122, using network data transfer techniques and protocols.

At step S23 the determination component 124 ascertains whether a registration data object associated with the requested data block is already registered in a list of registration data objects. To this end, the determination component 124 may examine each entry in the list registration data objects 130 stored in the memory 106. A matching registration data object is found, for example, when a registration data object contains the binary data of the requested data block or includes address information pointing to a memory location holding the requested data block. The determination component 124 typically searches for a matching registration data object by comparing a data block identifier derived from the requested data block against data block identifiers stored in registration data objects, however, the determination component may also proceed by comparing data sequences between the requested data block and the registration data objects, comparing information descriptors associated with the requested data block and the registration data objects, and the like.

At step S24 the determination component 124 decides whether a registration data object exists that is associated with the requested data block. When the decision at step S24 is "NO" (i.e., a registration data object corresponding to the requested data block cannot be identified), then at step S25 the filing component 126 registers a new registration data object based on the request data object. The new registration data object therefore is associated with the requested data block and thus may contain the binary data of the requested data block or may contain address information indicating a storage location of the requested data block. Further, the registration data object may contain additional information on resources used for the requested data block, as specified by the request data object, such as processes executed in connection with the requested data block.

However, when the decision at step S24 is "YES" (i.e., a registration data object corresponding to the requested data block already exists), then a new registration data object is not created.

In either case, at step S26 the handle object component 128 generates a registration handle object associated with the matching registration data object. The registration handle object may, for example, essentially correspond to the registration data object. In other words, the registration handle object may contain similar or identical information to that present in the registration data object.

As a result, the registration handle object will be associated with the same resources in connection with the requested data block as recorded by the registration data object. For example, the registration handle object may include the actual binary data of the requested data block although it instead typically provides address information of a memory area holding the requested data block, and/or further information on resources allocated for the requested data block, such as processes running in connection with the requested data block.

Thereafter, at step S27, the registration server transmits the registration handle object to the client program 117 from which the request data object originated. As a result, the client program 117 gains access to the resources associated with the registration data object, and, in particular, the requested data block. For example, the client program 117 may obtain address information specifying a memory area holding the requested data block or information on one or more processes running in connection with the requested data block.

When a registration data object associated with the requested data block was matched, the registration server has already allocated resources for the requested data block. Thus, any resources allocated (for example, by the client program 117) in connection with the request data object and the requested data block may be released. In other words, duplicate allocation of resources is avoided.

Said another way, the registration server typically registers a new registration data object for each request data object once, when the request data object for a particular requested data block is first received. The corresponding resources allocated for the requested data block may then be used for any subsequent request data objects associated with the same requested data block. Therefore, a significant reduction in resource usage may be achieved, since, for example, memory space for storing the requested data block is maintained once, and, for example, processes running in connection with the requested data block are maintained once.

It is noted that the registration server may handle request data objects received from numerous client programs, all located on the registration server itself, or distributed across a network among the network processing systems 118-122. When the registration server may expect request data objects to arrive from numerous sources, identification information for the requesting client program 117 is typically included in the request data object. Nevertheless, resources allocated in connection with a requested data block may be shared by all client programs that request a particular data block.

Figure 3:
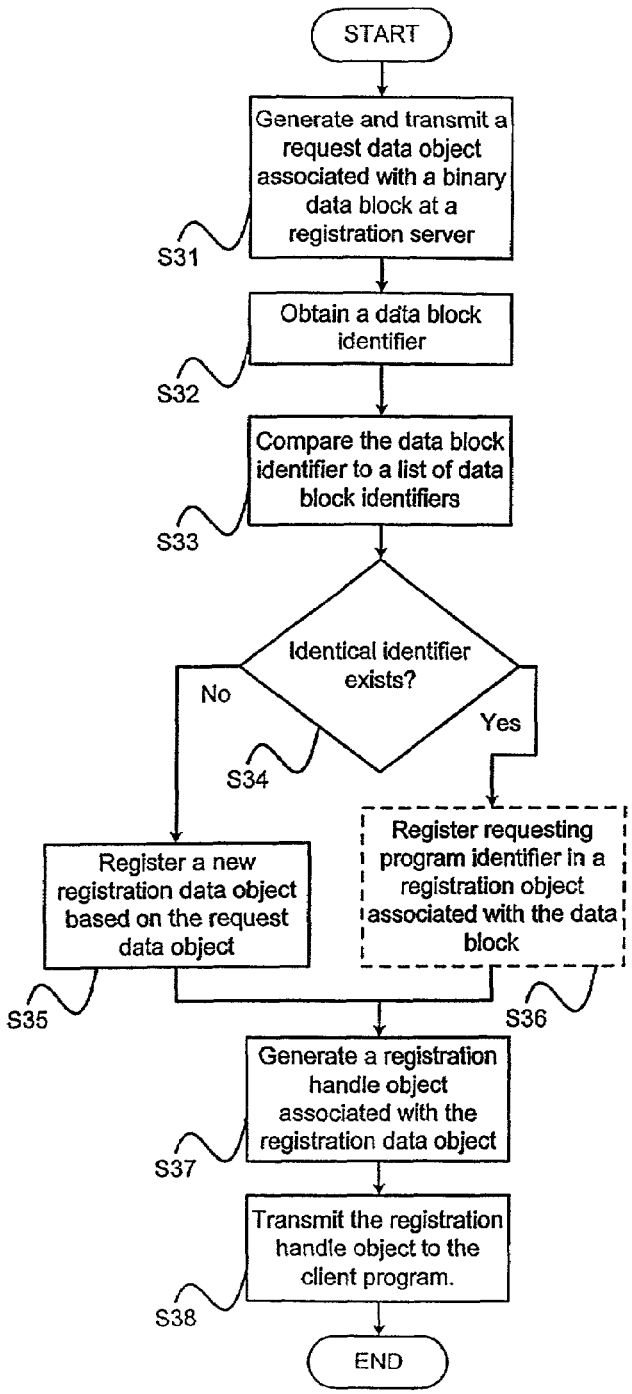
FIG. 3 shows a flow diagram illustrating a flow of processing steps that particularly illustrate steps for registering a request data object.

Turning next to FIG. 3, that figure shows a flow chart of a process for registering data blocks consistent with the present invention, and highlighting the steps performed by the determination component and the filing component. The steps described below may be executed using the registration server program 116 on the processing system 100, for example, however, the process shown in FIG. 3 is not limited thereto.

At step S31 a client program 117 generates a request data object associated with a requested data block and transmits the request data object to a registration server. The steps of generating and transmitting the request data object are outlined above in the discussion of FIG. 2.

At step S32, the determination component 124 obtains a data block identifier identifying the requested data block that is typically derived from the data block. When the binary data of the requested data block is included in the request data object, the determination component 124 may proceed to obtain the data block identifier directly from the binary data. On the other hand, when address information indicating a memory area holding the requested data block is instead included in the request data object, the determination component 124 typically retrieves the binary data of the requested data block from the indicated memory area and then obtains the data block identifier.

The determination component 124 may obtain the data block identifier, for example, by calculating a checksum (e.g., a 32-bit cyclic redundancy code ("CRC 32") or a 32-bit Adler checksum ("ADLER 32", named after one of its researchers Mark Adler)) over constituent data that may be whole or part of the data block. Additionally, however, further characteristic information for the requested data block may be included as part of the data block identifier. The characteristic information may include, as examples, a data block type (e.g., an image, video sequence, or audio) image size information (e.g., height and width of an image), video sequencing information, alpha-channel information indicating properties such as translucence of an image, and color information. When the requested data block is an audio data block, the characteristic information may be, as examples, song title, duration, sample rate, and the like.

Additional information on the requested data block may be included into the data block identifier if desired. The data block identifier may in some cases uniquely identify a specific requested data block. However, it is also suitable for the data block identifier to reduce the probability of obtaining identical data block identifiers for different binary data blocks to an acceptable predetermined level . As an example, a 16-byte checksum data block identifier generally reduces the risk of obtaining identical data block identifiers for different binary data blocks to an acceptable level for most applications.

Continuing with regard to FIG. 3, at step S33 the determination component 124 compares the data block identifier calculated in connection with the requested data block with data block identifiers stored in connection with registration data objects. The comparison proceeds until all the registration data objects have been examined, or until a match is found.

At step S34 the determination component 124 decides whether an identical identifier in the list of registration data objects exists. When the decision is "NO" (an identical identifier does not exist), the filing component 126 registers a new registration data object with the data block identifier obtained by the determination component 124 and associated with the requested data block. Thus, the registration data object inserted in the list of registration data objects includes the data block identifier, the binary data of the requested data block, or address information of a memory area holding the requested data block, identification information for an requesting client program 117, and may also include information on further resources allocated in connection with the requested data block as outlined before.

When the decision in step S34 is "YES" (a data block identifier identical to the data block identifier calculated in connection with the requested binary data block can be identified), a registration operation is not necessary. However, when the registration server may expect to receive request data objects from numerous client programs, the filing component 126 optionally (in step S36) stores identification information on the requesting client program 117 in the matching registration data object. Thus, the registration server may maintain information in the registration data object list concerning the client program 117 that request particular data blocks.

Next, at step S37 the handle object component 128 generates a registration handle object associated with the matched registration data object. Note that when the determination component 124 finds no matching registration data object, the filing component 126 may use the address information for the requested data block already present in the request data object in the new registration data object. The address information may then carry over into the registration handle object. In other words, the registration server may use memory areas allocated by the client program 117, or may allocate its own memory areas for the requested data blocks. When the determination component 124 finds that a matching registration data object does exist, however, the address information in the request data object will differ from the address information in the matching registration data object, and the memory area allocated for the requested data block in connection with the request data object may be released in order to free resources.

Thereafter, at step S38 the registration server transmits the registration handle object to the originating client program 117, thereby allowing the client program 117 to use resources allocated in connection with the registration data object and to free all other resources allocated in connection with the requested data object. As a result, a memory area for a requested data block may be maintained once, all other memory areas allocated for the requested data block by the client programs may be released.

Figure 4:
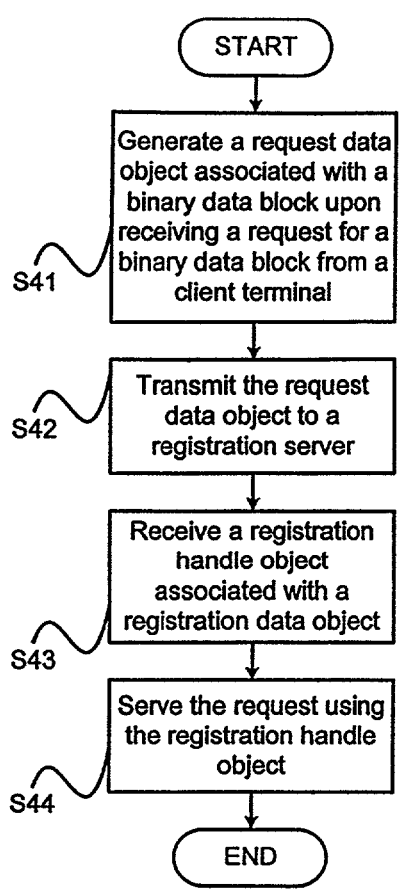
FIG. 4 shows a flow diagram illustrating a flow of processing steps that particularly illustrate steps performed at a client program that requests data blocks.

With regard next to FIG. 4, that figure illustrates a flow chart of the process performed by the client program 117 that request data blocks in a manner consistent with the present invention. At step S41, a client program 117 generates a request data object associated with a requested data block. The request data object may be generated, for example, in response to a request from a client, such as a data processing system 118-122 that controls the execution of the client program 117.

At step S42 the client program 117 transmits the request data object to the registration server. The registration server proceeds as explained above to respond to the request for the data block. Thereafter, at step S43, the client program 117 means receives a registration handle object associated with a registration data object. The registration data object, in turn, is associated with the requested data block and resources for handling the requested data block, as outlined above.

As will be explained below in more detail with regard to FIG. 5, at step S44 the client program 117 serves a client terminal program with the requested data block using the registration handle object. To this end, the client program 117 may, for example, retrieving the requested data block from the indicated memory area and transfer the requested data block to the client terminal for local display, for audio playback, and the like.

Figure 5:
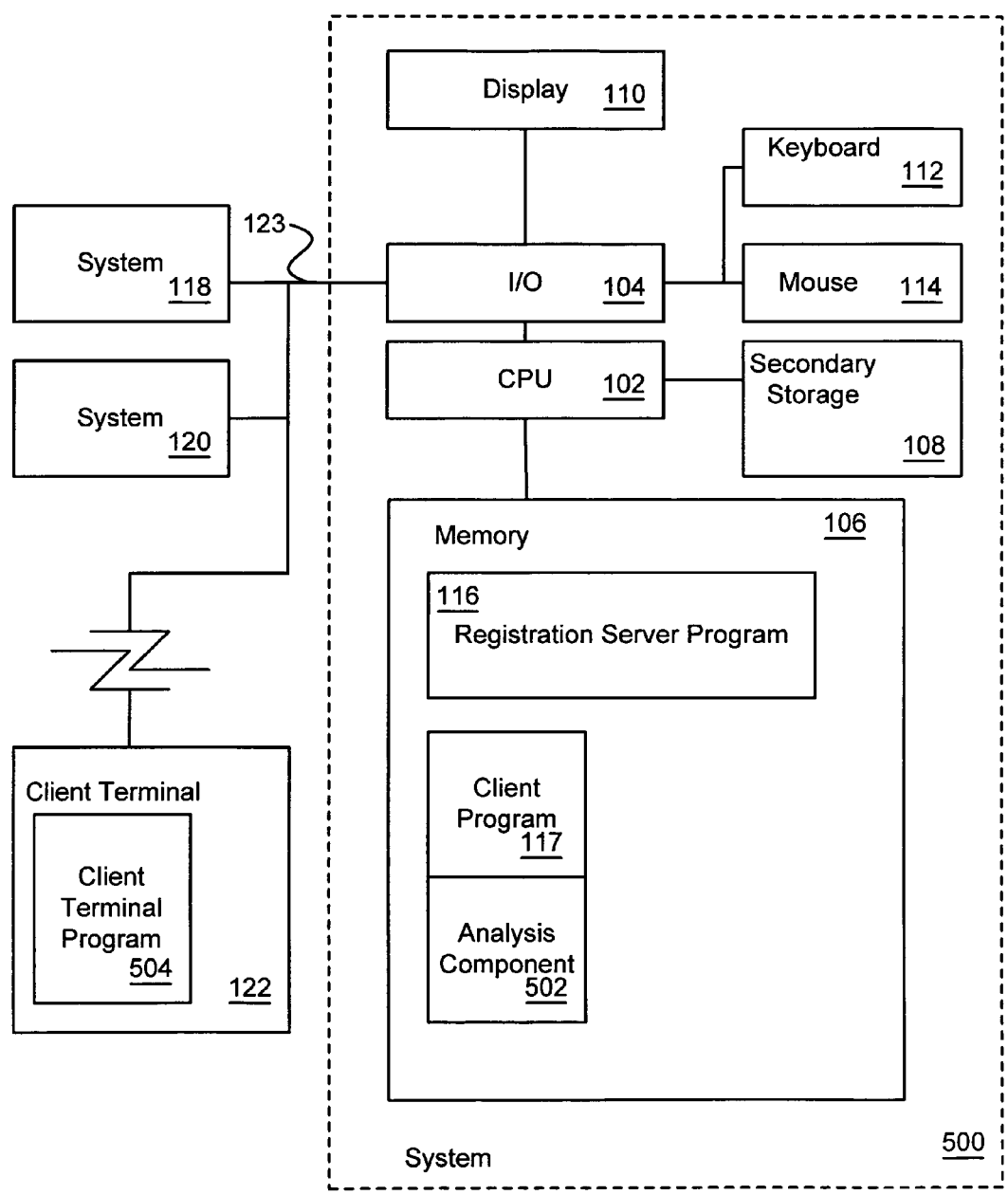
FIG. 5 shows a block diagram illustrating elements of a system for registering data blocks.

Turning next to FIG. 5, that figure shows a block diagram of a data processing system 500 suitable for practicing methods and implementing systems consistent with the present invention. The data processing system 500 is configured in a manner similar to the data processing system 100. Note, however, that (as explained in more detail below) the networked processing system 122 specifically assumes the role a client terminal executing a client terminal program 504, and that the client program 117 includes an analysis component 502.

It is first noted that the client terminal may be any general purpose data processing system. For example, the client terminal may represent an X Terminal communicating with the system 100 using the X11 protocol, or a home computer under control of an operator that, for example, remotely executes a client program 117 at one or more of the general purpose processing systems 100, 118-120. As additional examples, the client terminal may be a mobile device such as a mobile computer, a mobile phone or a mobile data organizer that includes data communication transceivers for connecting to the client program 117. As will be explained in more detail below, the client terminal program 504 includes instructions for generating a request for a data block, including a client terminal request identifier, for receiving the binary data of a requested data block or an identifier of a requested data block already transmitted to the client terminal, and for using a local copy of the requested data block.

In accordance with the implementation shown in FIG. 5, the request data object includes a client terminal request identifier specified by the client terminal program when requesting a data block. The client terminal request identifier allows a determination of whether the requested data block was transmitted to that client terminal at an earlier point in time. The client terminal request identifier included in the request data object may be an interface generated by the a client program 117 upon receiving a request for a data block from the client terminal. The interface, for example, may be a handle object including characterizing information on the client terminal and on the identity of a particular request received from the client terminal. As one particular example, the request identity information may be the current value of a sequential number incremented by the client terminal with each request for a data block.

As explained above, the registration server program 116 determines whether a registration data object corresponding to the request data object is registered in the list of registration data objects. Further, the registration server program 116 registers the request data object as outlined before, including the client terminal request identifier. In addition, the registration handle object transmitted from the registration server to the client program 117, in addition to information noted above, also includes the client terminal request identifier.

The analysis component 502 operates in conjunction with the client program 117 to analyze the registration handle object received from the registration server. The analysis component may thereby determine whether the client processing system 122 requested the data block at an earlier point in time. Note that the registration server will save the client terminal request identifier (e.g., the sequential number) of the first request for a data block in a new registration data object. Thus, when the client terminal request identifier of the request data object and the client terminal request identifier of the registration handle object are identical, the client terminal has requested the data block for the first time. In this case, the binary data of the requested data block may be transmitted from the client program 117 to serve the client terminal 122.

However, when the client terminal request identifier of the request data object and the client terminal request identifier of the registration handle object are different, the client terminal requested the binary data block at least once at an earlier point in time (i.e., in connection with a previous request for the data block). Thus, a local copy of the requested data block is already available at the client terminal. In this case the client program 117, typically transmits a prior transmission indicator (e.g., a predetermined command word or bit sequence) for the binary data block to the client terminal, thereby allowing the client terminal to access its local copy of the requested data block.

Accordingly, the system 500 provides that data for a requested data block (such as a graphic element for local display at the client terminal) is typically transmitted to the client terminal once. Any further request for the requested data block results in the client terminal receiving a prior transmission indicator so that it may use a local copy of the requested data block. Avoiding duplicate retransmission of the data block results in substantial savings in bandwidth.

Figure 6:
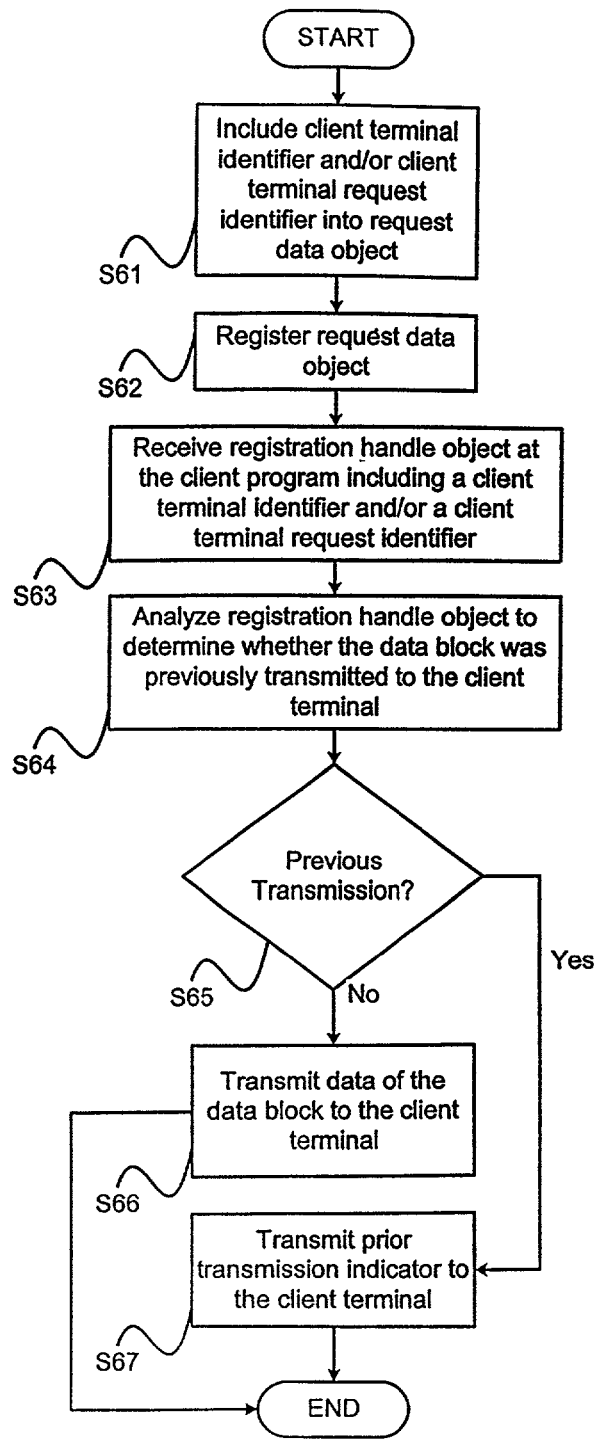
FIG. 6 shows a flow diagram illustrating a flow of processing steps that particularly illustrate steps for serving a client terminal request.

Turning next to FIG. 6, that figure shows a flow chart of a process for serving a request from a client terminal in a manner consistent with the present invention. At step S61, the client program 117 creates a request data object that includes client terminal information (e.g., data identifying the client terminal) and an interface containing information on the identity of a particular request for a data block (e.g., a sequential number). The requesting program then transmits the request data object to the determination component.

At step S62 the registering server performs the registering steps outlined above. In particular, when the determination component cannot identify a corresponding registration data object, the filing component registers a new registration data object that includes the client terminal identifier and the client terminal request identifier. As noted above, the registration data object may also include a data block identifier, an identifier of at least one resource allocated in connection with the data block, and an identifier of the client program 117.

Next, at step S63, the client program 117 receives a registration handle object. In addition to the information present in the registration handle object explained above, the registration handle object may further return the client terminal identifier found in the matching registration data object.

At step S64, the analysis component 502 then examines the registration handle object to determine whether the requested data block was previously transmitted to the client terminal. To this end, the analysis component 502 may comprise instructions that compare the client identifier and the client terminal request identifier in the registration handle object with the client terminal identity and the request identity found in the request data object. A match indicates that the requested binary data block was not previously transmitted to the client terminal. When there is no match, the requested data block was transmitted to the client terminal at an earlier time in connection with a previous request for the data block.

If it is determined that the requested data block was not previously transmitted to the client terminal, processing proceeds to step S66. At step S66, the client program 117 transmits the binary data of the requested data block to the client terminal. On the other hand, when the requested data block was previously transmitted to the client terminal, then processing proceeds to step S67. At step S67, the client program 117 transmits instead a prior transmission indicator of the requested data block to the client terminal. The prior transmission indicator instructs the client terminal to use a local copy of the requested data block.

The implementation outlined with respect to FIGS. 5 and 6 allows a substantial reduction in bandwidth requirements because a requested data block is typically transmitted to a client processing system once. For each subsequent request for a particular data block, typically only a (typically much smaller) prior transmission indicator is transmitted to the client terminal.

Figure 7:
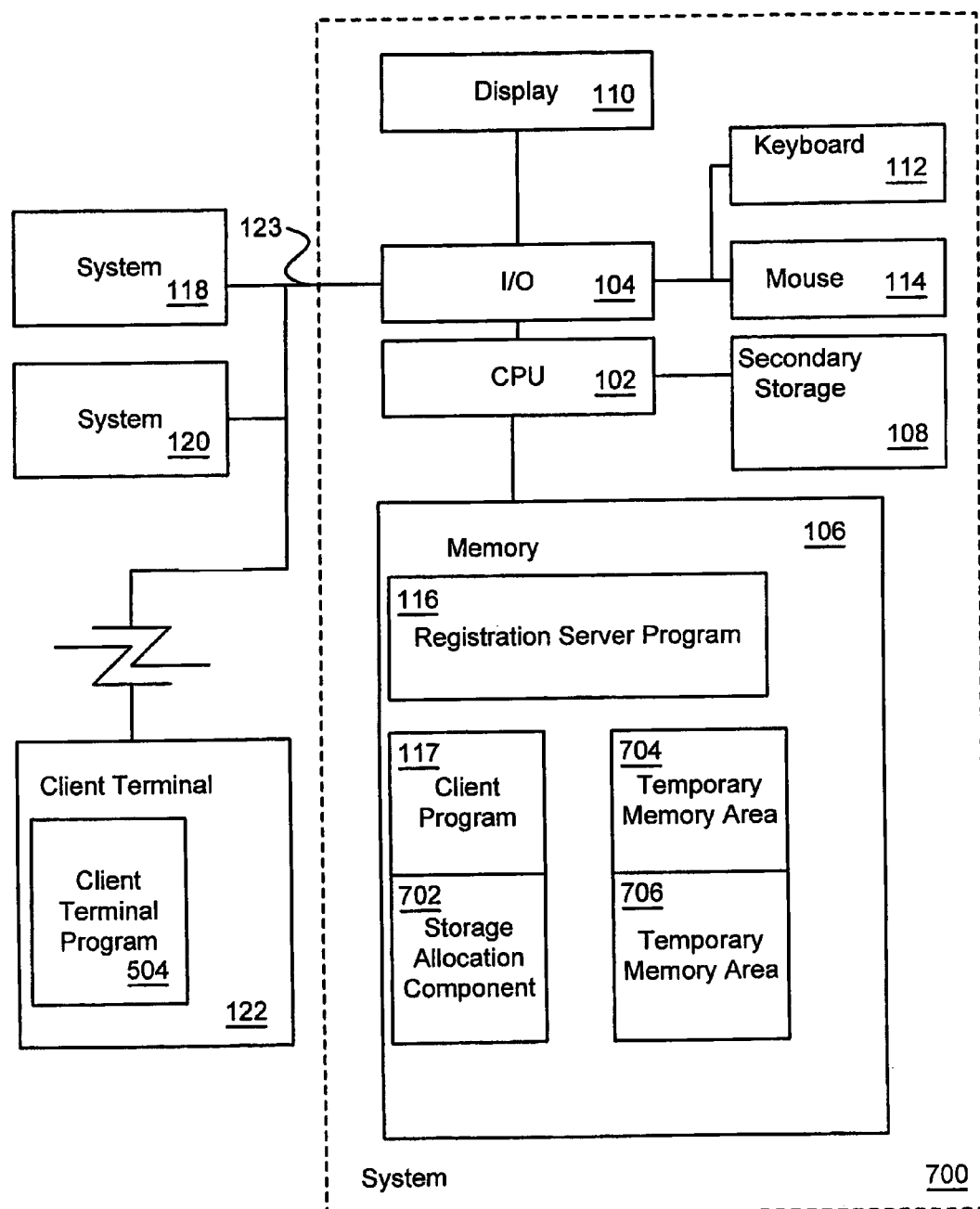
FIG. 7 shows a block diagram illustrating elements of a system for registering data blocks.

Turning next to FIG. 7, that figure shows a block diagram of a data processing system 700 suitable for practicing methods and implementing systems consistent with the present invention. The data processing system 700 elaborates on the data processing system 100 with regard to the allocation and release of temporary memory areas used to hold requested data blocks and to prevent duplication of resources. The data processing system 700 may generally be implemented as noted above with respect to FIGS. 1 and 5.

FIG. 7 particularly shows a storage allocation component 702 of a client program 117 that allocates, for example, temporary memory areas 704 and 706. The storage allocation component 702 is responsible for allocating and releasing temporary memory areas for holding the requested data block. To that end, the storage allocation component 702 may comprise instructions that allocate a temporary memory area for a data block when the registration server receives a request for a data block from the client program 117. Alternatively, the temporary memory area for the requested data block may be allocated when the client program 117 generates a request data object or when a request data object is otherwise received at the registration server. The temporary memory areas may be allocated in the memory 106, secondary storage 108, or any other available storage.

The request data object may then include address information of the temporary memory area allocated for the requested data block (e.g., the temporary memory area 704) when transmitted to the registration server or communicated to the determination component. After the registration process described above, a registration handle object returns from the registration server to the client program 117. If the current request is the first request for the data block, the registration handle object will include address information typically pointing to the same memory area 704 as originally specified in the request data object. The address information points to the same memory area 704 because the filing component created a new registration data object based on the request data object.

However, when the data block was previously requested, the matching registration data object is not based on the current request data object. Instead, the matching registration data object was based on a prior request data object (e.g., the first request data object received for the particular data block). Thus, a registration handle object containing address information pointing to a prior allocated temporary memory area (for example, the prior memory area 706) returns to the client program 117. The client program 117 may use the prior temporary memory area 706 in connection with serving the request for the data block. Accordingly, the temporary memory area 704 allocated in connection with the pending request data object may be released.

Figure 8:
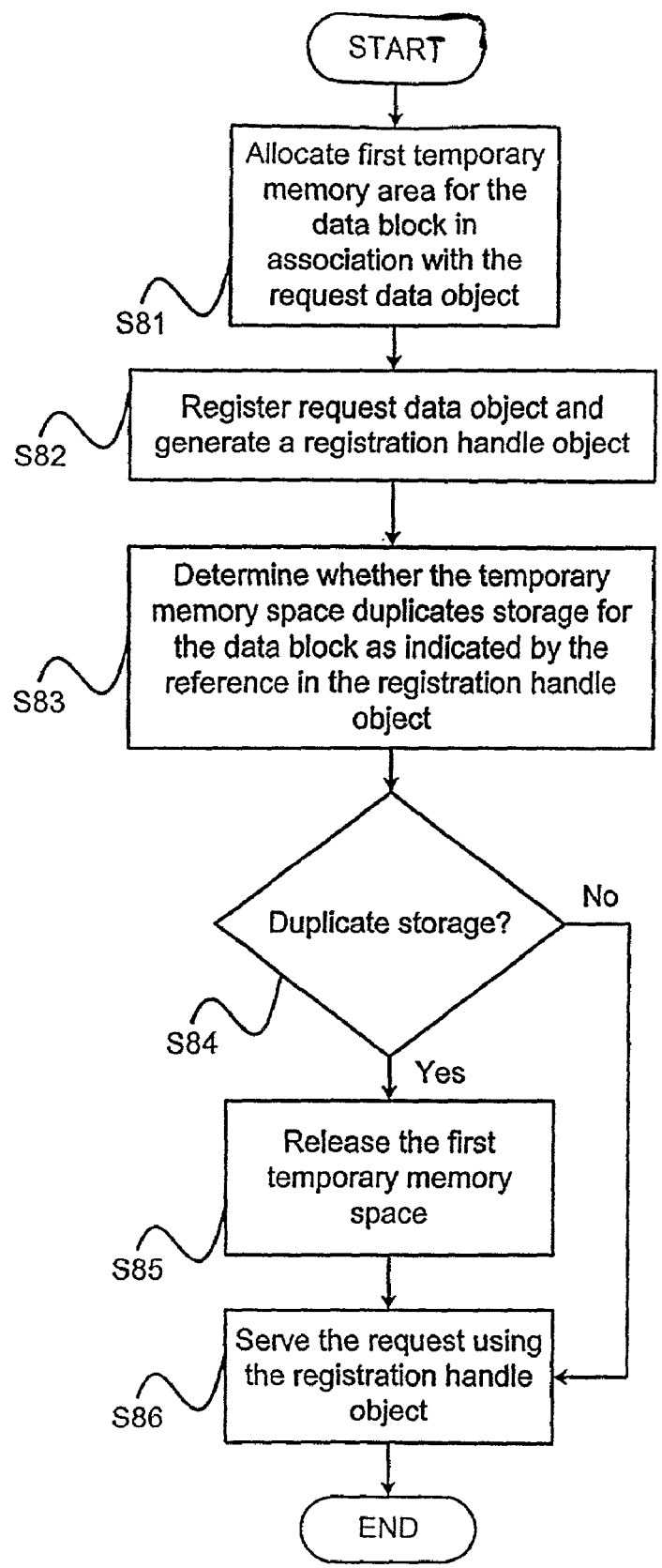
FIG. 8 shows a flow diagram illustrating a flow of processing steps that particularly illustrate steps for managing temporary memory space.

With regard next to FIG. 8, that figure shows a flow chart of a process for allocating and releasing memory areas in a manner consistent with the present invention. At step S81, the storage allocation component allocates a first memory area 704 for the requested data block. At step S82 the registration server processes the request data object and a registration handle object is generated, as explained above.

Next, at step S83, the storage allocation component 702 determines whether the address information in the registration handle object indicates that the requested data block is temporarily allocated memory at two different areas. Step S84 is a branch that depends on the result of step S83. When a duplicate memory area has been allocated for the requested data block, the storage allocation component 702 releases one of the memory areas (e.g., the first memory area 704) at step S85. Otherwise, the temporary memory space is not released. Finally, at step S86, the client program 117 serves the request using the registration handle object.

Note that although the embodiment of FIG. 8 was described with respect to memory resources, any other resource allocated in connection with the requested data block may be handled in a similar manner. For example, a process executed in connection with a requested data object may be allocated or released as described above.

Figure 9:
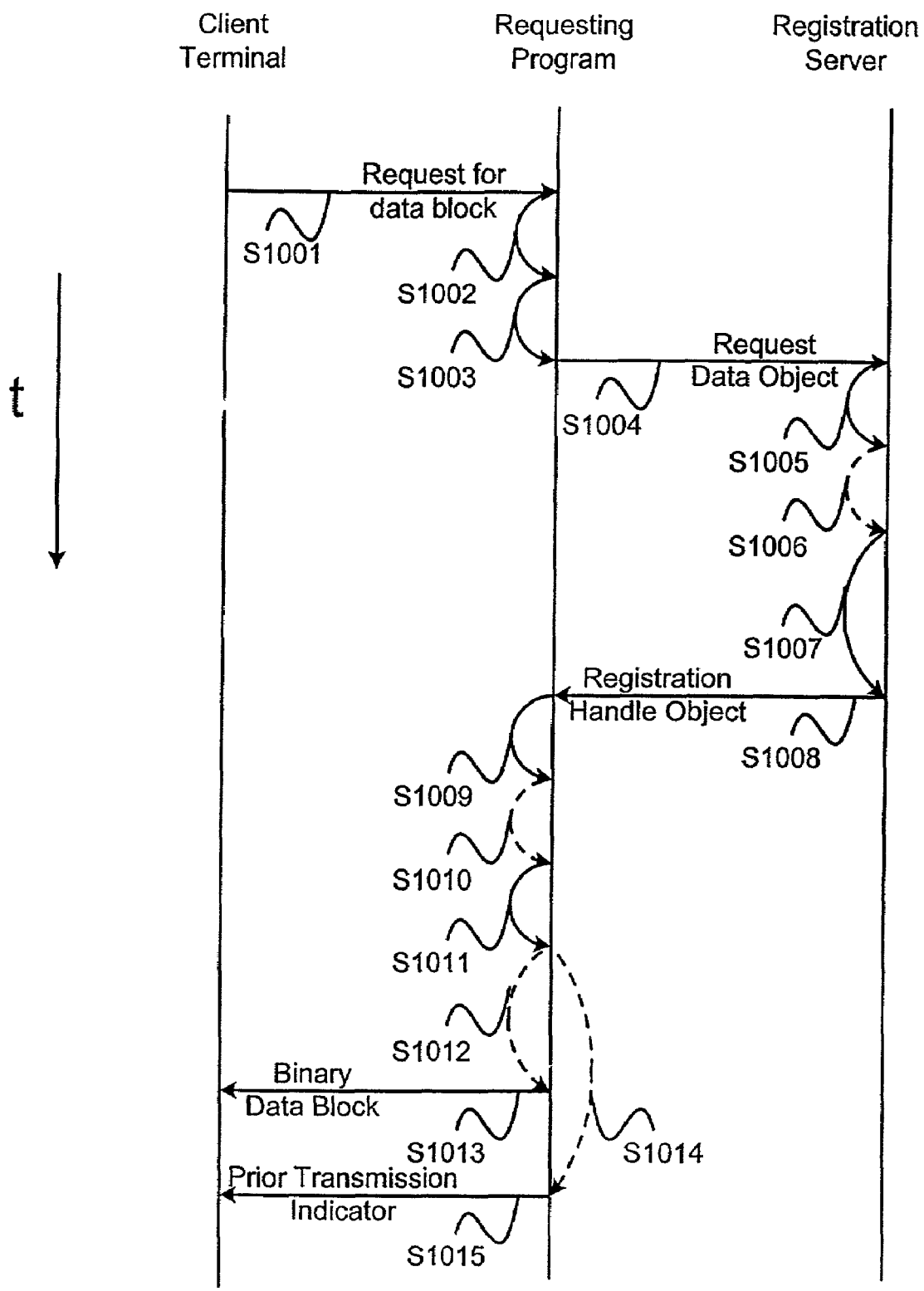
FIG. 9 shows a time sequence illustrating a flow of processing steps for registering data blocks.

Turning next to FIG. 9, that figure illustrates a flow chart of a sequence of data block registration events and messages transmitted over time between programs consistent with the present invention. As explained above, the programs may be distributed among the networked processing systems 118-122 and the general purpose processing system 100. Generally, FIG. 9 shows message flow between a client terminal, a requesting program, and a registration programs.

First, at step S1001 a client terminal transmits a request for a data block to a client program which will, in turn, issue a request data object. The storage allocation component 702, in conjunction with the receipt of the request by the client program, allocates a temporary memory area 704 for the data block at step S1002. Thereafter, at step S1003 the client program generates a request data object as outlined above.

At step S1004, the client program communicates the request data object to the registration server, and, in particular, the determination component. At step S1005, the determination component ascertains whether a registration data object associated with the binary data block is already registered in a collection of registration data objects, as explained in detail above.

As shown by step S1006, when the determination component ascertains that a registration data object for the requested data block is not already registered, the filing component registers a new registration data object in the list of registration data objects based on the request data object. Thereafter, at step S1007 the handle object component generates a registration handle object associated with the registration data object for the requested data block. The registration handle object thereby provides a reference to resources allocated for the requested data block. At step S1008 the registration program communicates the registration handle object to the requesting program.

At step S1009, the analysis component examines the registration handle object to determine whether the memory area referenced in the registration handle object is duplicated by the temporary memory area 704 allocated in step S1002. If the temporary memory area 704 does duplicate storage already referenced by the registration handle object, then, at step S1010, the storage allocation component 702 releases the temporary memory area 704.

Next at step S1011, the analysis component examines the registration handle object to determining whether the requested data block has already been transmitted to the client terminal in connection with serving a previous request from the client terminal. If the analysis component determines in step S1011 that the requested data block was not previously transmitted to the client terminal, then, at step S1012 the requesting program retrieves the data for the requested data block using the registration handle object. The requesting program then transmits, at step S1013, the data to the client terminal.

When the requested data block has been previously transmitted to the client terminal, then (at step S1014) the requesting program generates a prior transmission indicator instructing the client terminal to reuse a local copy of the requested data block. At step S1015 the requesting program transmits the prior transmission indicator to the client terminal.

The foregoing description of an implementation of the present invention has been presented for purposes of illustration and description. It is not exhaustive and does not limit the present invention to the precise form disclosed. Modifications and variations are possible in light of the above teachings or may be acquired from practicing of the present invention. For example, the described implementation includes software but methods, systems, and articles of manufacture consistent with the present invention may be implemented as a combination of hardware and software or in hardware alone. The present invention may be implemented with both object-oriented and non-object-oriented programming systems. The scope of the present invention is defined by the claims and their equivalents.

What is claimed is:

1. A method in a data processing system for facilitating reuse of data blocks, the method comprising the steps of:
   generating at a requesting program a request data object based on a requested data block, the request data object including at least one of binary data of the requested data block and an initial reference to binary data of the requested data block;
   communicating the request data object to a determination component;
   receiving at the determination component the request data object;
   obtaining a request data block identifier for the requested data block derived from constituent data of the requested data block;
   determining, based on the request data block identifier, whether the requested data block is a registered data block represented by an existing request data object in a request data object collection;
   when the data block is not a registered data block, registering the request data object in the collection of data blocks by creating a new request data object based on the request data object and inserting the new request data object into the request data object collection;
   generating a registration handle object for accessing the data block, the registration handle object comprising at least one of the binary data of the requested data block, the initial reference to binary data of the requested data block, and an existing reference to binary data of the requested data block;
   returning the registration handle object to the requesting program;
   allocating a temporary memory area for the requested data block;
   analyzing a memory reference in the registration handle object to determine whether the memory reference points to other than the first temporary memory area; and
   releasing the temporary memory area when the memory reference points to other than the first temporary memory area.

2. A method according to claim 1, further comprising the step of releasing duplicate resources allocated to the requested data block.

3. A method according to claim 1, wherein the step of obtaining the request data block identifier comprises the step of obtaining a codeword derived from the constituent data.

* * * * *

UNITED STATES PATENT AND TRADEMARK OFFICE
CERTIFICATE OF CORRECTION

PATENT NO.       : 7,603,407 B2
APPLICATION NO.  : 09/932229
DATED            : October 13, 2009
INVENTOR(S)      : Kai Ahrens and Sven Jacobi Page 1 of 1

It is certified that error appears in the above-identified patent and that said Letters Patent is hereby corrected as shown below:

On the Title Page Item (30) in the Foreign Application Priority Data section:

• the omitted data should read  -- August 17, 2000  (EP)  0011723.7 --.

Signed and Sealed this

First Day of December, 2009

David J. Kappos
*Director of the United States Patent and Trademark Office*